United States Patent
Doumoto et al.

(10) Patent No.: US 10,519,961 B2
(45) Date of Patent: Dec. 31, 2019

(54) VENTILATION DEVICE

(71) Applicant: Panasonic Intellectual Property Management Co., Ltd., Osaka (JP)

(72) Inventors: Kazuki Doumoto, Aichi (JP); Tsuraki Nakajima, Aichi (JP); Harumoto Itou, Aichi (JP); Yuusuke Urata, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 291 days.

(21) Appl. No.: 15/519,664

(22) PCT Filed: Oct. 20, 2015

(86) PCT No.: PCT/JP2015/005267
§ 371 (c)(1),
(2) Date: Apr. 17, 2017

(87) PCT Pub. No.: WO2016/067552
PCT Pub. Date: May 6, 2016

(65) Prior Publication Data
US 2017/0248149 A1    Aug. 31, 2017

(30) Foreign Application Priority Data

Oct. 28, 2014  (JP) .................................. 2014-218783
Dec. 3, 2014   (JP) .................................. 2014-244623

(51) Int. Cl.
*F04D 27/00*     (2006.01)
*H02P 27/06*    (2006.01)
(Continued)

(52) U.S. Cl.
CPC ............ *F04D 27/004* (2013.01); *F24F 11/74* (2018.01); *F24F 11/77* (2018.01); *H02P 6/18* (2013.01); *H02P 27/06* (2013.01); *F04D 25/08* (2013.01)

(58) Field of Classification Search
CPC ............... F04D 27/004; F04D 15/0066; F04D 15/0094; F04D 25/08; F04D 27/00;
(Continued)

(56) References Cited

U.S. PATENT DOCUMENTS 5,463,299 A  * 10/1995  Futami ...................... H02P 6/06
                                                            318/400.13
7,671,555 B2 *  3/2010  Mullin .................. F04D 27/004
                                                            236/51

(Continued)

FOREIGN PATENT DOCUMENTS

JP           10-155297 A      6/1998
JP         2002-165477 A      6/2002
JP         2011-202902 A     10/2011

OTHER PUBLICATIONS

International Search Report of PCT application No. PCT/JP2015/005267 dated Dec. 8, 2015.

*Primary Examiner* — Nathan C Zollinger
(74) *Attorney, Agent, or Firm* — Pearne & Gordon LLP

(57) ABSTRACT

A ventilation device includes AC voltage estimation unit (32) for estimating an AC voltage, based on a DC voltage detected by voltage detection unit (30) and a current detected by current detection unit (20). Air volume computation unit (24) determines a rotation speed of a motor, based on the AC voltage estimated by AC voltage estimation unit (32) and a target air volume output from a target air volume computation unit.

7 Claims, 7 Drawing Sheets

(51) Int. Cl.
*F24F 11/77* (2018.01)
*F24F 11/74* (2018.01)
*H02P 6/18* (2016.01)
*F04D 25/08* (2006.01)

(58) Field of Classification Search
CPC .. H02P 29/10; H02P 29/40; H02P 6/18; H02P 27/06; F24F 11/77; F24F 11/74
See application file for complete search history.

(56) References Cited

U.S. PATENT DOCUMENTS

| | | | | |
|---|---|---|---|---|
| 8,297,068 | B2* | 10/2012 | Yokouchi | F04D 27/004 |
| | | | | 62/239 |
| 8,356,983 | B2* | 1/2013 | Shizuo | F04D 27/004 |
| | | | | 417/42 |
| 9,631,830 | B2* | 4/2017 | Sasaki | G05D 7/0629 |
| 9,771,944 | B2* | 9/2017 | Sasaki | H02P 6/06 |
| 9,835,350 | B2* | 12/2017 | Hu | G05B 15/02 |
| 9,903,380 | B2* | 2/2018 | Sun | F04D 27/004 |
| 10,041,496 | B2* | 8/2018 | Nakajima | F04D 27/004 |
| 10,396,693 | B2* | 8/2019 | Ji | |
| 2006/0179859 | A1* | 8/2006 | Nakata | H02P 6/06 |
| | | | | 62/228.1 |
| 2016/0131142 | A1* | 5/2016 | Nakajima | F04D 27/004 |
| | | | | 417/42 |
| 2017/0248149 | A1* | 8/2017 | Doumoto | H02P 6/18 |

\* cited by examiner (1) Approximation for 90 V
(2) Approximation for 100 V
(3) Approximation for 110 V
(4) Estimated approximation for $V_x$ (5) Estimated approximation for 200 V (1) Reference table for 110 V
(2) Reference table for 100 V
(3) Reference table for 90 V
(4) New reference table for 105 V Average value of DC voltage (1) Approximation for 90 V
(2) Approximation for 100 V
(3) Approximation for 110 V (6) Approximation for 190 V
(5) Approximation for 200 V
(7) Approximation for 210 V (1) Reference table for 110 V
(2) Reference table for 100 V
(3) Reference table for 90 V (6) Reference table for 190 V
(5) Reference table for 200 V
(7) Reference table for 210 V

VENTILATION DEVICE

TECHNICAL FIELD

The present invention relates to a ventilation device for controlling an air volume.

BACKGROUND ART

A control circuit in a conventional air blowing device available as a ventilation device is configured as described below. Alternating current (AC) power supplied from an AC power supply is first converted by an AC-direct current (DC) conversion circuit from an alternating current into a DC, and then the DC is smoothed by a capacitor. A DC voltage generated at both ends of the capacitor is input via a current detector into an inverter. Upon the input of DC voltage, the inverter causes six semiconductors configuring the inverter to mutually operate (switch) to drive a motor. Since a current flowing into the motor flows via the inverter and the current detector, a voltage induced on both ends of the current detector is detected.

The motor is attached with a position sensor that generates a signal corresponding to a position of a rotor that has moved as the motor rotates. Based on a signal from the position sensor, a rotation speed detection unit detects a rotation speed of the motor. The rotation speed detected at this time is output to an air volume computation unit and a speed controller. Based on a current value of the motor, which is detected by the current detection unit, and a rotation speed of the motor, which is detected by the rotation speed detection unit, the air volume computation unit computes a volume of air generated by a fan coupled to the motor.

A deviation between an air volume computed by a target rotation speed computing unit and a target air volume is further measured to compute a target rotation speed toward which the motor operates so that the deviation becomes 0. The speed controller controls a speed of the motor toward the target rotation speed computed by the air volume computation unit. Therefore, since a volume of air generated by the fan coupled to the motor can reach the target air volume, a configuration of constantly controlling an air volume has been achieved (for example, see Patent Literature 1).

CITATION LIST

Patent Literature

PTL1: Unexamined Japanese Patent Publication No. 2002-165477

SUMMARY OF THE INVENTION

In such a conventional air blowing device, an air volume has been computed by using a current flowing into a motor and a rotation speed of the motor. In other words, such a conventional air blowing device has been configured such that a smoothed DC voltage is detected by a voltage detection unit to determine a target air volume, and a motor is controlled so that a present air volume computed, based on signals sent from a current detector and a rotation speed detection unit conforms to the target air volume.

Since such an air blowing device detects a DC voltage obtained by smoothing with a capacitor AC power supplied from an AC power supply, if a voltage of the AC power supply fluctuates, the DC voltage smoothed by the capacitor also fluctuates. On the other hand, since, if a load fluctuates, a DC voltage also fluctuates, it is difficult to determine whether either the fluctuated AC voltage or the fluctuated load has caused the fluctuated DC voltage. As a result, an AC voltage required for computing a target air volume cannot correctly be detected, accordingly, an air volume has not precisely been adjusted.

In view of the above described problems, the present invention has an object to provide a ventilation device capable of precisely controlling an air volume toward a target air volume without being affected by a fluctuation in voltage of an AC power supply.

A ventilation device according to the present invention includes blades, a motor that drives the blades, and an alternating current-direct current conversion circuit that converts an AC voltage supplied externally into a DC voltage to output the DC voltage. The ventilation device further includes an inverter circuit that converts the DC voltage output from the AC-DC conversion circuit into an AC voltage through a three-phase pulse width modulation (PWM) method to apply the AC voltage to the motor, and a voltage detection unit that detects the DC voltage applied to the inverter circuit. The ventilation device further includes a current detection unit that detects a current flowing into the motor, a rotation detection unit that computes a rotation speed and a position of the motor, based on the current detected by the current detection unit, and a target air volume computation unit that outputs a target air volume toward which the motor provides an air volume. The ventilation device further includes an air volume computation unit that compares a present output air volume with the target air volume output from the target air volume computation unit to instruct a rotation speed, and a speed controller that changes a duty for the inverter circuit, based on a result of comparison performed by the air volume computation unit to control a rotation speed of the motor. The ventilation device further includes an AC voltage estimation unit that estimates an AC voltage, based on the DC voltage detected by the voltage detection unit and the current detected by the current detection unit. The air volume computation unit determines a rotation speed of the motor, based on the AC voltage estimated by the AC voltage estimation unit and the target air volume output from the target air volume computation unit.

According to the above described configuration, the present invention provides a ventilation device capable of keeping a ventilation air volume at a constant value without being affected by a fluctuation in voltage of an AC power supply.

DESCRIPTION OF EMBODIMENTS

Exemplary embodiments of the present invention will be described with reference to the drawings. The exemplary embodiments described below are merely specific examples of the present invention, and are not intended to limit the technical scope of the present invention. In all the drawings, identical components are applied with identical numbers or symbols, and are described only once.

First Exemplary Embodiment

A ventilation device according to a first exemplary embodiment of the present invention attached to a ceiling of a building will be described herein.

The ventilation device according to this exemplary embodiment fully utilizes features of a DC motor to control its rotation speed in a range from a lower rotation speed to a higher rotation speed, so that the single ventilation device can provide an air volume in a range from a small air volume to large air volume.

Figure 1:
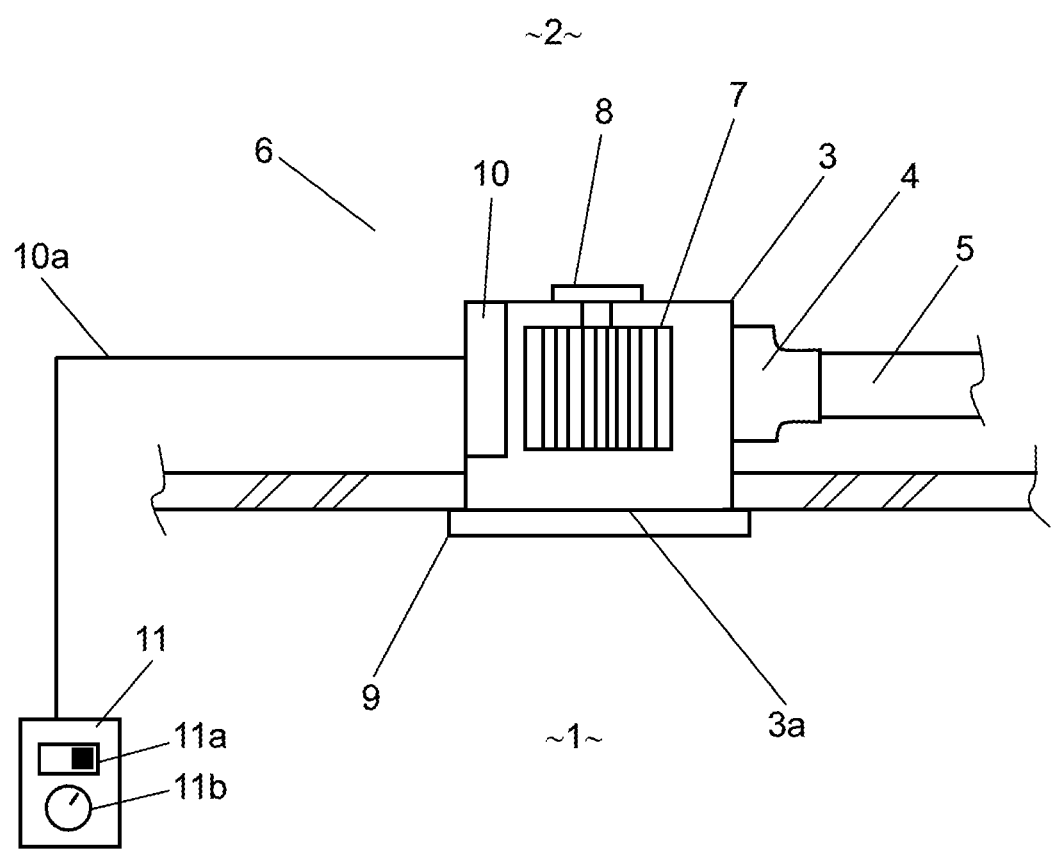
FIG. 1 is an installation diagram illustrating a situation where a ventilation device according to a first exemplary embodiment of the present invention is attached to a ceiling.

FIG. 1 is an installation diagram illustrating a situation where the ventilation device according to the first exemplary embodiment of the present invention is attached to the ceiling. In FIG. 1, body 3 is seen transparent internally.

As shown in FIG. 1, body 3 of ventilation device 6 according to this exemplary embodiment is installed in attic 2, a space of which is provided, via a top board, above interior 1. Under body 3, body 3 has suction port 3a that opens toward interior 1. Adaptor 4 is provided on a side of body 3. Through exhaust duct 5 coupled to adaptor 4, body 3 is coupled to an exhaust port (not shown) provided on an exterior wall or a similar portion.

Inside body 3, blades 7 and motor 8 for rotating blades 7 are provided. Motor 8 is specifically a sensorless, brushless DC motor.

Suction port 3a includes louver 9 for covering suction port 3a.

Louver 9 has a ventilation port through which interior air passes. Control circuit 10 for driving motor 8 is disposed inside body 3. Remote controller 11 including power supply ON-OFF switch 11a and fan notch setting switch 11b is disposed on a wall of interior 1, and is connected to control circuit 10 via signal line 10a.

Figure 2:
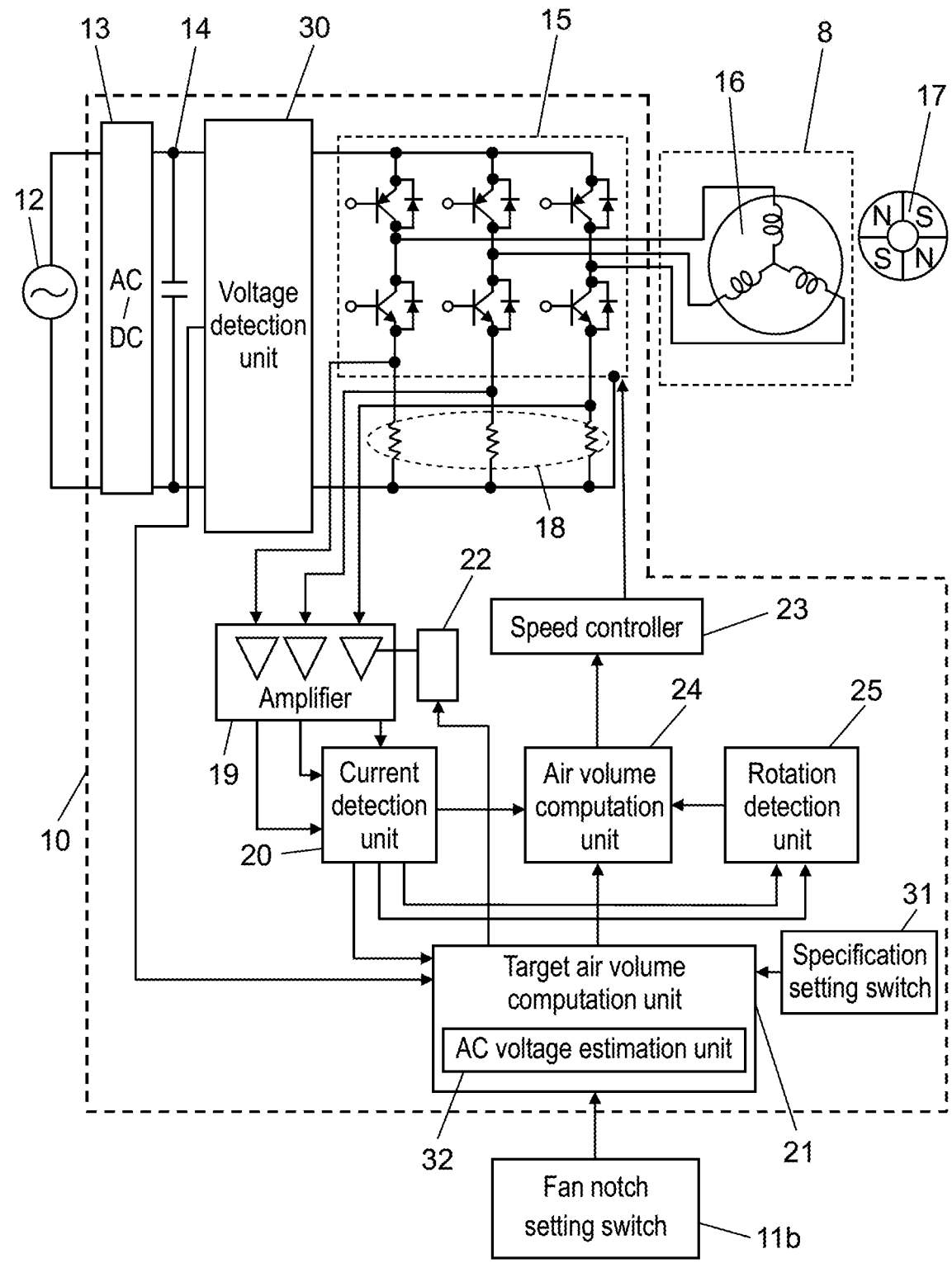
FIG. 2 is a block diagram illustrating a configuration of a control circuit of the ventilation device according to the first exemplary embodiment of the present invention.

FIG. 2 is a block diagram illustrating a configuration of control circuit 10 of ventilation device 6 according to the first exemplary embodiment of the present invention.

Control circuit 10 includes, as shown in FIG. 2, AC-DC conversion circuit 13, smoothing capacitor 14, and inverter circuit 15.

Control circuit 10 converts an AC voltage supplied from commercial power supply 12 into a DC voltage with AC-DC conversion circuit 13, and then smoothes the DC voltage with smoothing capacitor 14.

Smoothing capacitor 14 applies the smoothed DC voltage to inverter circuit 15.

With the DC voltage being applied, inverter circuit 15 conducts electricity to six switching devices configuring inverter circuit 15 to drive motor 8. Inverter circuit 15 converts the DC voltage output from AC-DC conversion circuit 13 into an AC voltage through a three-phase Pulse Width Modulation (PWM) method to apply the AC voltage to motor 8.

Motor 8 includes stator 16 winded with a coil, and rotor 17 including a permanent magnet. Motor 8 includes three phases of U, V, and W, and is driven for rotation by accepting, at the three phases, currents supplied from inverter circuit 15.

Smoothing capacitor 14 is connected with voltage detection unit 30 for detecting a DC voltage and inverter circuit 15 disposed in parallel each other.

Between a lower stage of the six switching devices of inverter circuit 15 and a negative electric potential side, shunt resistors 18 are inserted so as to respectively correspond to the phases.

Amplifier 19 amplifies a difference in potential between both ends of each of shunt resistors 18, which occurs due to currents flowing into shunt resistors 18.

Based on outputs from amplifier 19, current detection unit 20 detects the currents flowing into the phases of motor 8.

Based on the currents detected by current detection unit 20, rotation detection unit 25 computes a rotation speed and a position of motor 8. A position referred in here represents a rotation angle of rotor 17 rotated from a predetermined reference position.

In accordance with a setting of fan notch setting switch 11b for switching an air volume provided by ventilation device 6, target air volume computation unit 21 determines target air volume Qs, and gives an instruction on target air volume Qs to air volume computation unit 24. A method for determining target air volume Qs will be described later. Target air volume computation unit 21 includes AC voltage estimation unit 32.

Based on a DC voltage detected by voltage detection unit 30 and a current detected by current detection unit 20, AC voltage estimation unit 32 estimates an AC voltage. Details will be described later.

Air volume computation unit 24 compares any one of values of the currents flowing into the phases, which are detected by current detection unit 20, and a rotation speed computed by rotation detection unit 25 with a current value and a rotation speed corresponding to target air volume Qs. Based on a result of comparison, air volume computation unit 24 determines whether a present air blow volume is higher or lower than target air volume Qs. Details will be described later.

Amplification factor changing unit 22 accepts an input of target air volume Qs computed by target air volume computation unit 21, and changes, in accordance with a magnitude of target air volume Qs, an amplification factor for amplifier 19 for a predetermined phase.

Based on an instruction given by air volume computation unit 24, speed controller 23 outputs a duty for inverter circuit 15 to change a rotation speed of motor 8.

Motor 8 changes a rotation speed to output a required air volume.

Figure 3:
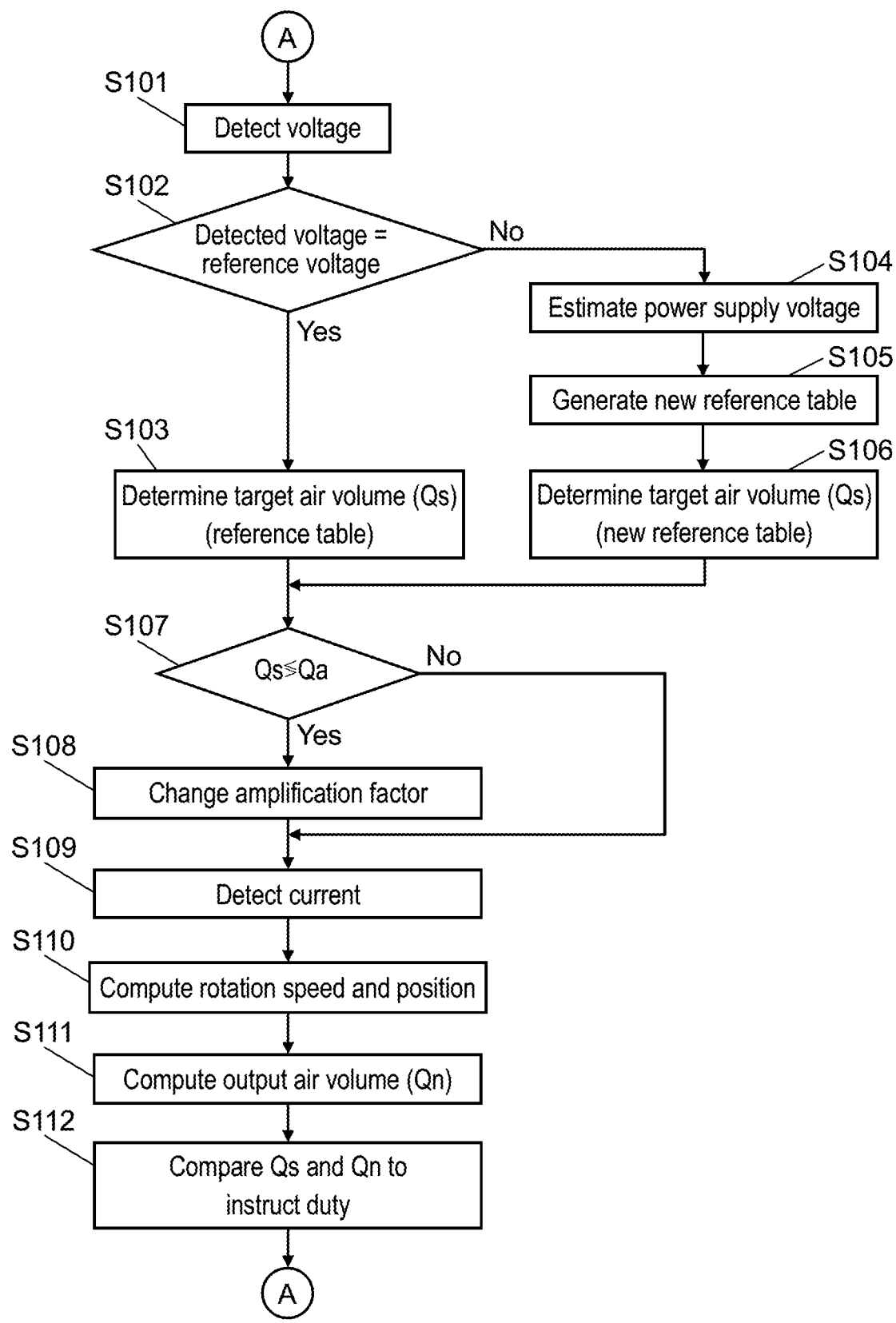
FIG. 3 is a flowchart illustrating an operation of the ventilation device according to the first exemplary embodiment of the present invention.

An operation of ventilation device 6 according to this exemplary embodiment will be described with reference to FIG. 3. FIG. 3 is a flowchart illustrating the operation of ventilation device 6 according to the first exemplary embodiment of the present invention.

To operate ventilation device 6, a user operates remote controller 11 to turn on commercial power supply 12 to body 3 of ventilation device 6, and sets fan notch setting switch 11b to, for example, a gentle notch.

When commercial power supply 12 to body 3 of ventilation device 6 is turned on, an AC voltage is applied from commercial power supply 12 to control circuit 10. The AC voltage supplied from commercial power supply 12 is converted into a DC voltage with AC-DC conversion circuit 13, and then smoothed with smoothing capacitor 14. With voltage detection unit 30 for detecting a DC voltage value, the smoothed DC voltage is detected and input into target air volume computation unit 21 (step S101).

Target air volume computation unit 21 compares the voltage detected by voltage detection unit 30, which is the input DC voltage, with a reference voltage (step S102).

A reference voltage is a DC voltage converted from an AC voltage supplied to serve as a reference by commercial power supply 12. For example, when a commercial AC voltage of 100 V used in Japan is supplied, a reference voltage is a DC voltage converted by AC-DC conversion circuit 13, and then smoothed by smoothing capacitor 14.

When the detected voltage and the reference voltage match, target air volume computation unit 21 uses a reference table to determine a current value and a rotation speed for achieving target air volume Qs (Yes in step S102→step S103).

A reference table is, when commercial power supply 12 supplies an AC voltage served as a reference, an operation condition for achieving target air volume Qs, in other words, a data group storing combinations of rotation speeds and current values.

A reference table is a table used for reference, and stores four items A, B, C, D associated each other and described below.

(A) Determined target air volume Qs (for example, a small air volume corresponding to the gentle notch).

(B) AC voltage served as a reference (for example, 100 V).

(C) Current value I for achieving target air volume Qs when the AC voltage served as the reference is supplied.

(D) Rotation speed r for achieving target air volume Qs when the AC voltage served as the reference is supplied.

A reference table is provided per notch that can be set by fan notch setting switch 11*b*.

A detailed procedure for determining target air volume Qs will be described later.

As a result of comparison between the input DC voltage and the reference voltage performed by target air volume computation unit 21, if the detected voltage and the reference voltage differ, target air volume computation unit 21 performs a power supply voltage estimation process (No in step S102→step S104). The power supply voltage estimation process is a process for precisely computing a value of an AC voltage supplied from a commercial power supply, based on a DC voltage and a motor current value, using a table or a relational expression stored beforehand in a memory.

A power supply voltage estimation method for an AC power supply will be described with reference to FIG. 4.

Figure 4:
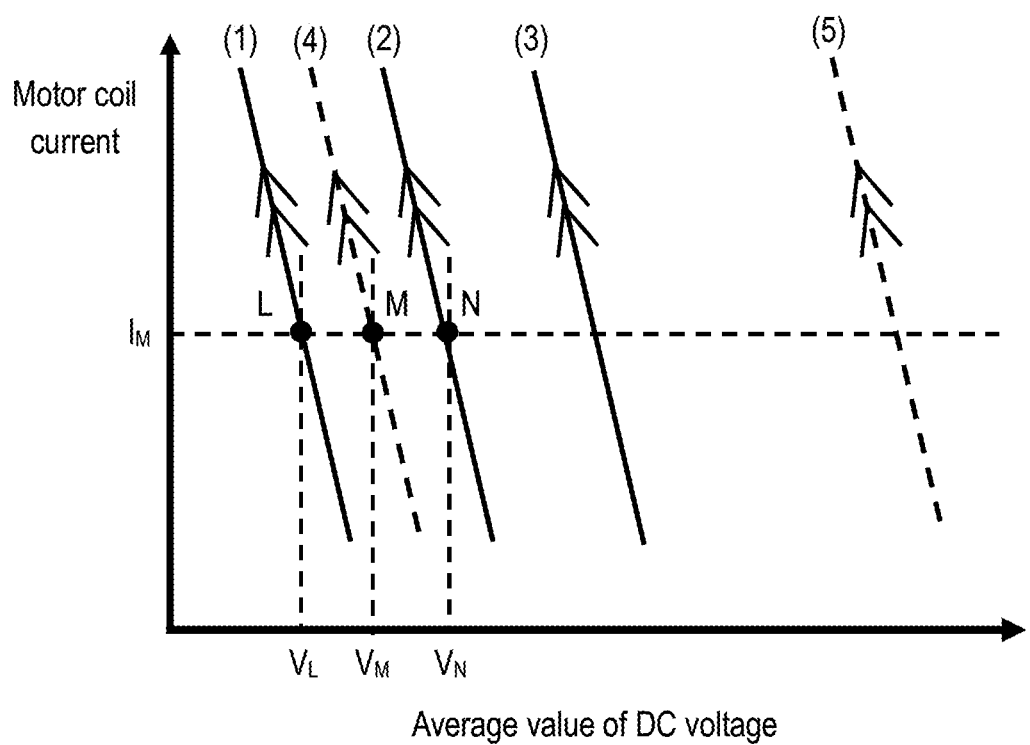
FIG. 4 is a graph illustrating an estimation method for an AC power supply for the ventilation device according to the first exemplary embodiment of the present invention.

FIG. 4 is a graph illustrating an estimation method for an AC power supply for ventilation device 6 according to the first exemplary embodiment of the present invention. FIG. 4 represents relationships between motor coil currents (vertical axis) and average values of DC voltages (horizontal axis) smoothed by smoothing capacitor 14. (1), (2), and (3) shown in FIG. 4 respectively represent relationships between motor coil currents (axis Y) and average values of DC voltages (axis X) smoothed by smoothing capacitor 14, which have been collinear approximated when AC voltages supplied from commercial power supply 12 are 90 V, 100 V and 110 V. A motor coil current can be obtained by subtracting a motor stand-by current from a current value detected by current detection unit 20 while a motor is operated. A motor coil current differs depending on motor 8, and is stored, for example, as a fixed value in the memory.

As shown in (1), (2), and (3) in FIG. 4, as an AC voltage supplied from commercial power supply 12 increases, an average value of DC voltage increases. A relationship between a motor coil current at an AC voltage and an average value of smoothed DC voltage can be collinear approximated so that, even if the AC voltage changes, its inclination is kept steady.

When the AC voltage is changed at the same motor coil current, an average value of DC voltage changes in proportion to the amount of change.

As described above, among approximation straight lines shown in FIG. 4, at least two of the approximation straight lines, in other words, at least two relationships between motor coil currents corresponding to AC voltages and average values of DC voltages, should be stored as estimation tables in, for example, a memory. A reason of why 90 V 100 V, and 110 V are used is that a fluctuation in voltage supplied from a commercial power supply is specified to 101 V±6 V by the Electricity Business Act in Japan.

Cases where relational expressions between 100 V specification motor coil currents and average values of DC voltages are applied will be described with reference to examples.

For example, a case when motor coil current $I_M$ and average value of DC voltage $V_M$ are detected at point M shown in FIG. 4 will be described. As described above, motor coil current $I_M$ is detected by current detection unit 20, and average value of DC voltage $V_M$ is detected by voltage detection unit 30.

AC voltage estimation unit 32 uses the two stored approximations (1), (2) shown in FIG. 4 to obtain an average value of DC voltage at identical motor coil current $I_M$. That is, average values of DC voltages $V_L$, $V_N$ at point L ($V_L$, $I_M$) with an AC voltage of 90 V and point N ($V_N$, $I_M$) with an AC voltage of 100 V are obtained.

Next, since an AC voltage and an average value of DC voltage are in a proportional relationship, for power supply voltage Vx in this case, $$(Vx-100)/(V_N-V_M)=-(100-90)/(V_N-V_L)$$

can be satisfied.

Therefore, AC voltage Vx at point M ($V_M$, $I_M$) can be obtained with $$Vx=100-(10\times(V_N-V_M)/(V_N-V_L))$$

(step S104).

Even if average value of DC voltage $V_M$ is either average value of DC voltage $V_L$ or lower, or average value of DC voltage $V_N$ or higher, a computation is possible by using either of the two relational expressions. That is, at any voltage, for example, a voltage for a different destination, such as an AC voltage of 200 V as shown in (5) in FIG. 4, a value can be obtained through either the two linear relational expressions.

This exemplary embodiment has described an example for estimating an AC voltage by referring to the two estimation tables stored in the memory. However, a computation may be performed, based on a predetermined formula for computation. One of the two estimation tables stored in the memory referred in here is, for example, as shown in (1) in FIG. 4, an estimation table in which a relationship between a motor coil current (vertical axis) and an average value of DC voltage (horizontal axis) when an AC voltage is 90 V is associated and stored as a numerical value. The other is, as shown in (2) in FIG. 4, an estimation table in which a relationship between a motor coil current (vertical axis) and an average value of DC voltage (horizontal axis) when an AC voltage is 100V is associated and stored as a numerical value.

Once AC voltage Vx is estimated, a new reference table is then generated, based on the reference tables (step S105). The new reference table is an operation condition for achieving target air volume Qs when estimated power supply voltage Vx is applied. In other words, the new reference table is a data group storing combinations of power supply voltages Vx, target air volumes Qs, rotation speeds, and current values, where a table format is almost identical to a format of the reference tables.

The new reference table is an updatable table used for reference, and stores four items E, F, G, H associated each other and described below.

(E) Determined target air volume Qs (for example, a small air volume corresponding to the gentle notch).

(F) Estimated AC voltage (voltage that is not available in reference table, for example, 105 V).

(G) Current value I for achieving target air volume Qs when the estimated AC voltage is applied.

(H) Rotation speed r for achieving target air volume Qs when the estimated AC voltage is applied.

In this exemplary embodiment, if a power supply voltage differs from a reference, a new reference table is newly generated and used, instead of the reference tables. For example, to store reference tables corresponding to voltages in a range from 90 V to 100 V inclusive in an increment of 0.1 V, 101 reference tables will be required. When such reference tables are expanded to a range from, for example, 90 V to 210 V inclusive, 1201 reference tables will be required. The present invention is a technology for preventing a memory resource from being wasted as described above.

Therefore, actions against fluctuations in AC voltage can be taken without requiring, for example, many reference tables corresponding to all applicable AC voltages stored in the memory.

Figure 5:
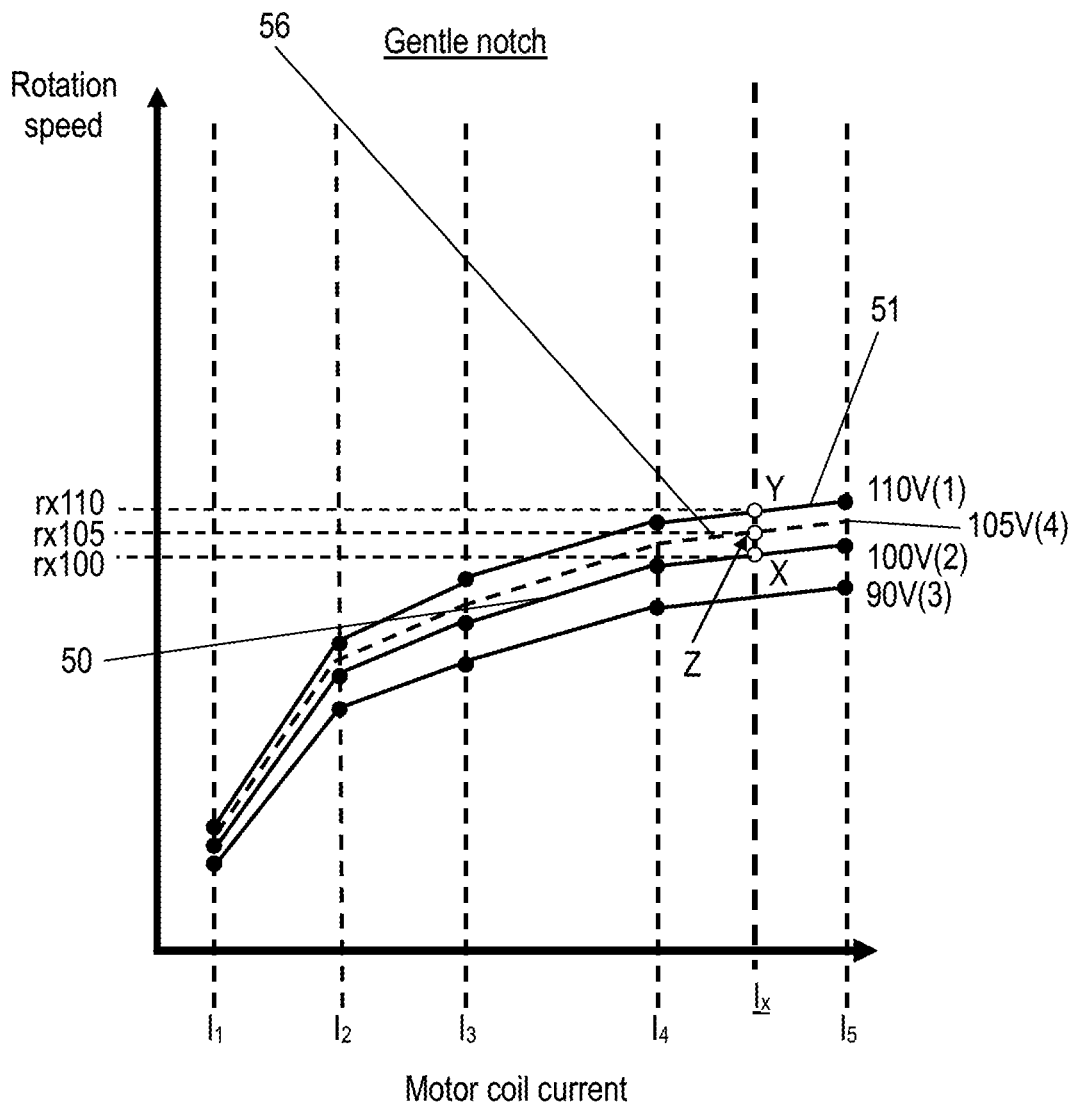
FIG. 5 is a graph illustrating a method for generating a new reference table for the ventilation device according to the first exemplary embodiment of the present invention.

A method for generating a new reference table will be described with reference to FIG. 5. FIG. 5 is a graph illustrating a method for generating a new reference table for ventilation device 6 according to the first exemplary embodiment of the present invention.

(1), (2), and (3) shown in FIG. 5 respectively represent relationships between motor coil currents (horizontal axis) and rotation speeds (vertical axis) when, for example, a gentle notch is selected in cases where AC voltages are 110 V, 100 V, and 90 V.

The graphs are plotted with dots (•) representing rotation speeds at motor coil currents $I_1$ to $I_5$ per AC voltage stored as a reference table. By connecting adjacent dots (•) with straight lines, relationships between motor coil currents and rotation speeds at power supply voltages are shown.

In other words, for example, solid line 50 is, at (A) the gentle notch that is target air volume Qs, and (B) an AC voltage served as a reference of 100 V, the above described reference table itself representing a relationship between (C) current value I for achieving target air volume Qs and (D) rotation speed r for achieving target air volume Qs. Similar or identical to solid line 50, solid line 51 is a graph of a reference table at an AC voltage served as a reference of 110 V.

A difference in AC voltage and a difference in rotation speed can be regarded as that the differences are in a proportional relationship.

If a voltage detected by voltage detection unit 30 falls outside three reference tables of 90 V 100 V, and 110 V served as references, for example, one of the reference tables, which is closest to an estimated AC voltage, has to be used. However, in such a method, an air volume cannot precisely be controlled toward a target air volume.

To this end, target air volume computation unit 21 generates a new reference table corresponding to a power supply voltage that is further precisely estimated.

At this time, as described above, the "gentle notch" set by using fan notch setting switch 11b is input into target air volume computation unit 21. Based on this information, target air volume computation unit 21 uses two of a plurality of the reference tables shown in FIG. 5 to generate a new reference table corresponding to the gentle notch and the estimated power supply voltage.

A case when generating, at a gentle notch of a 100 V specification, a new reference table, based on the reference tables will now be described herein with reference to examples.

In here, power supply voltage Vx of a commercial power supply, which is estimated with the above described method, is specified to 105 V, and a motor coil current detected by current detection unit 20 at that time is specified to Ix. Rotation speed $rx_{100}$ at motor coil current Ix and an AC voltage of 100 V is computed through a proportional calculation, based on (I4 (100 V), r4 (100 V)) and (I5 (100 V), r5 (100 V)) shown in the reference table. Similarly, rotation speed $rx_{110}$ at an AC power supply voltage of 110 V is computed through a proportional calculation, based on (I4 (110 V), r4 (110 V)) and (I5 (110 V), r5 (110 V)) shown in the reference table. In addition, since a difference in AC voltage and a difference in rotation speed are in a proportional relationship, when a target rotation speed at a power supply voltage of 105 V is specified to $rx_{105}$, $$(rx_{105}-rx_{100})/(105-100)=(rx_{110}-rx_{100})/(110-100)$$

can be satisfied. For target rotation speed $rx_{105}$, $$rx_{105}=5\times(rx_{110}-rx_{100})/10+rx_{100} \text{ can be obtained.}$$

As described above, a new reference table at the gentle notch and estimated voltage Vx, in other words, a combination of motor coil current Ix (105 V) corresponding to estimated voltage Vx and target rotation speed $rx_{105}$ can be computed.

By performing this process for motor coil currents $I_1$ to $I_5$, for example, a new reference table represented by dotted line 56, in other words, new reference table (4) corresponding to an AC voltage of 105 V can be generated (step S105).

Even if an estimated voltage is 110 V or higher, or 90 V or lower, a target rotation speed can be obtained by using any two stored reference tables. That is, for example, even with a voltage for a different destination, such as an AC voltage of 200 V as shown in (5) in FIG. 4, a new reference table for 205 V, for example, can be generated from any two reference tables.

Once a new reference table is generated, target air volume computation unit 21 uses an estimated AC voltage and the new reference table to determine a current value and a rotation speed for achieving target air volume Qs (step S106).

As described above, when a detected voltage is identical to a reference voltage of 100 V, a rotation speed and a current value for achieving target air volume $Qs_{100}$ can be determined by referring to a target rotation speed and a current value in one of the reference tables stored beforehand in the memory, without performing an above described computation (step S103).

A process for determining, using the reference tables and a new reference table, a current value and a rotation speed for achieving target air volume Qs when a predetermined notch is selected has been described.

If present output air volume Qn is too smaller than a rated air volume, less current flows in shunt resistors 18, thus current detection unit 20 cannot precisely detect a current flowing into the coil current. If target air volume Qs is smaller than predetermined air volume Qa served as a reference, amplification factor changing unit 22 performs a process for increasing an amplification factor for amplifier 19 for detecting a current value to be input into air volume computation unit 24, in other words, performs a change process (Yes in step S107→step S108).

Predetermined air volume Qa is a value that is too smaller than a rated air volume, at which an amplification factor should be switched to allow current detection unit 20 to precisely detect a coil current. Predetermined air volume Qa should be set beforehand and stored in the memory.

If target air volume Qs is too larger than predetermined air volume Qa, an amplification factor is lowered or changed. If target air volume Qs and predetermined air volume Qa are identical, an amplification factor remains unchanged (No in step S107→step S109).

A term "small" used in here is referred to, for example, as a small air volume corresponding to the gentle notch, a term "large" used in here is referred to as a large air volume corresponding to a strong notch, and a term "identical" used in here is referred to, for example, as a medium air volume corresponding to a medium notch. Predetermined air volume Qa is, for example, the medium air volume corresponding to the medium notch.

Current detection unit 20 detects a difference in potential at both ends of respective shunt resistors 18, and, based on the difference in potential, detects per phase a coil current flowing into the coil of motor 8 (step S109). Among the detected coil currents, the coil currents flowing into two of the phases are input into rotation detection unit 25. Although details will be described later, the coil current flowing into a rest of the phases is input into air volume computation unit 24. Rotation detection unit 25 computes a rotation speed and a position of motor 8 from the coil currents flowing into the two phases (step S110).

Next, air volume computation unit 24 computes present output air volume Qn, based on the current value flowing into the rest of the phases, which is detected by current detection unit 20, and a rotation speed detected by rotation detection unit 25 (step S111). Air volume computation unit 24 compares computed output air volume Qn with target air volume Qs determined in accordance with the reference tables or a new reference table.

If present output air volume Qn is smaller than target air volume Qs, air volume computation unit 24 gives an instruction to speed controller 23 to output a greater duty. If output air volume Qn is larger than target air volume Qs, air volume computation unit 24 gives an instruction to speed controller 23 to output a smaller duty.

More specifically, air volume computation unit 24 compares a current value detected by current detection unit 20 and a rotation speed detected by rotation detection unit 25, both of which represent present output air volume Qn, with a plurality of combination candidates of current values and rotation speeds corresponding to target air volume Qs determined by target air volume computation unit 21. Based on a rotation speed, for example, air volume computation unit 24 changes a duty as described above. In other words, if a rotation speed corresponding to present output air volume Qn is greater than a rotation speed being compared with respect to target air volume Qs, air volume computation unit 24 gives an instruction to speed controller 23 to output a smaller duty. If a rotation speed corresponding to present output air volume Qn is fewer than a rotation speed being compared with respect to target air volume Qs, air volume computation unit 24 gives an instruction to speed controller 23 to output a greater duty.

Therefore, a control for reducing a deviation between output air volume Qn and target air volume Qs can be performed. Based on an instruction given by air volume computation unit 24, speed controller 23 outputs a duty to inverter circuit 15 (step S112).

When a current value and a rotation speed of a combination candidate match with a current value and a rotation speed of target air volume Qs while such a process is repeated, it can be determined that target air volume Qs is achieved.

Upon output of a duty to inverter circuit 15, electricity is conducted to the six switching devices in order to drive motor 8 configured by a sensorless, brushless DC motor.

A series of process steps S101 to S112 as described above is executed in a control cycle, and then the series of process steps is repeatedly executed per control cycle.

Even if a power supply voltage of an AC power supply fluctuates, ventilation device 6 configured as described above estimates a fluctuation value to control motor 8. In other words, if a power supply voltage fluctuates, motor 8 is controlled in accordance with the fluctuation, thus a further precise air volume constant control can be achieved.

A relationship between a current and a rotation speed, values of which are factors for determining an air volume, is computed as required for correspondence, without requiring relationships stored in a memory with respect to all ranges of voltages that could be fluctuated. Therefore, an identical process can be performed in a wider voltage range, while a manufacturing cost can be reduced without wasting a large amount of resources.

By inserting shunt resistors 18 respectively per phase between a lower stage of the phases in inverter circuit 15 for supplying a current to motor 8 and a negative electric potential side to detect currents flowing into shunt resistors 18, coil currents can precisely be detected.

This exemplary embodiment is configured such that amplification factor changing unit 22 switches an amplification factor in response to target air volume Qs. However, an amplification factor may be switched based on a current value detected by current detection unit 20.

This exemplary embodiment is configured to include motor 8 that is a sensorless, brushless DC motor. Amplification factor changing unit 22 for switching an amplification factor may be applicable to a brushless DC motor for which a position of rotor 17 relative to stator 16 is detected using an output of a magnetic sensor. That is, an identical effect can be achieved in a configuration where shunt resistor 18 is coupled to one of the phases, and amplification factor changing unit 22 switches an amplification factor for amplifier 19 for amplifying a difference in potential at both ends of shunt resistor 18.

As described above, ventilation device 6 according to this exemplary embodiment includes blades 7, motor 8 for driving blades 7, AC-DC conversion circuit 13 for converting an AC voltage supplied externally into a DC voltage to output the DC voltage. Ventilation device 6 further includes inverter circuit 15 for converting the DC voltage output from AC-DC conversion circuit 13 into an AC voltage through a three-phase PWM method to apply the AC voltage to the motor, and voltage detection unit 30 for detecting the DC voltage applied to inverter circuit 15. Ventilation device 6 further includes current detection unit 20 for detecting a current flowing into motor 8, rotation detection unit 25 for computing a rotation speed and a position of the motor, based on the current detected by current detection unit 20, and target air volume computation unit 21 for outputting a target air volume toward which motor 8 should provide an air volume. Ventilation device 6 further includes air volume computation unit 24 for comparing a present output air volume with the target air volume output from target air volume computation unit 21 to instruct a rotation speed, and speed controller 23 for changing a duty for inverter circuit 15, based on a result of comparison performed by air volume computation unit 24 to control a rotation speed of motor 8. Ventilation device 6 further includes AC voltage estimation unit 32 for estimating an AC voltage, based on the DC voltage detected by voltage detection unit 30 and the current detected by current detection unit 20. Air volume computation unit 24 determines a rotation speed of the motor, based on the AC voltage estimated by AC voltage estimation unit 32 and the target air volume output from the target air volume computation unit.

Therefore, if a power supply voltage fluctuates, motor 8 is controlled in accordance with the fluctuation, thus a further precise air volume constant control can be achieved.

AC voltage estimation unit 32 may estimate an AC voltage, based on a first estimation table corresponding to one of the two estimation tables storing a digitized relationship between a first DC voltage and a current flowing into the coil of motor 8 when the first DC voltage is applied, a second estimation table corresponding to the other of the two estimation tables storing a digitized relationship between a second DC voltage and a current flowing into the coil of motor 8 when the second DC voltage is applied, the DC voltage detected by voltage detection unit 30, and a current detected by current detection unit 20. Therefore, a memory resource can be prevented from being wasted.

Ventilation device 6 according to this exemplary embodiment may include two reference tables corresponding to two different AC voltages. The reference tables may associate with each other and store target air volume A, AC voltage B, current value C for achieving target air volume A when AC voltage B is applied, and rotation speed D for achieving target air volume A when AC voltage B is applied. If a supplied AC voltage differs from AC voltage B, air volume computation unit 24 may generate, based on the two reference tables and an AC voltage estimated by AC voltage estimation unit 32, a new reference table that is equivalent to a new reference table corresponding to the estimated AC voltage to determine a rotation speed of motor 8, based on the new reference table and the estimated AC voltage. Therefore, if a power supply voltage fluctuates, motor 8 is controlled in accordance with the fluctuation, thus a further precise air volume constant control can be achieved.

Second Exemplary Embodiment

Figure 6:
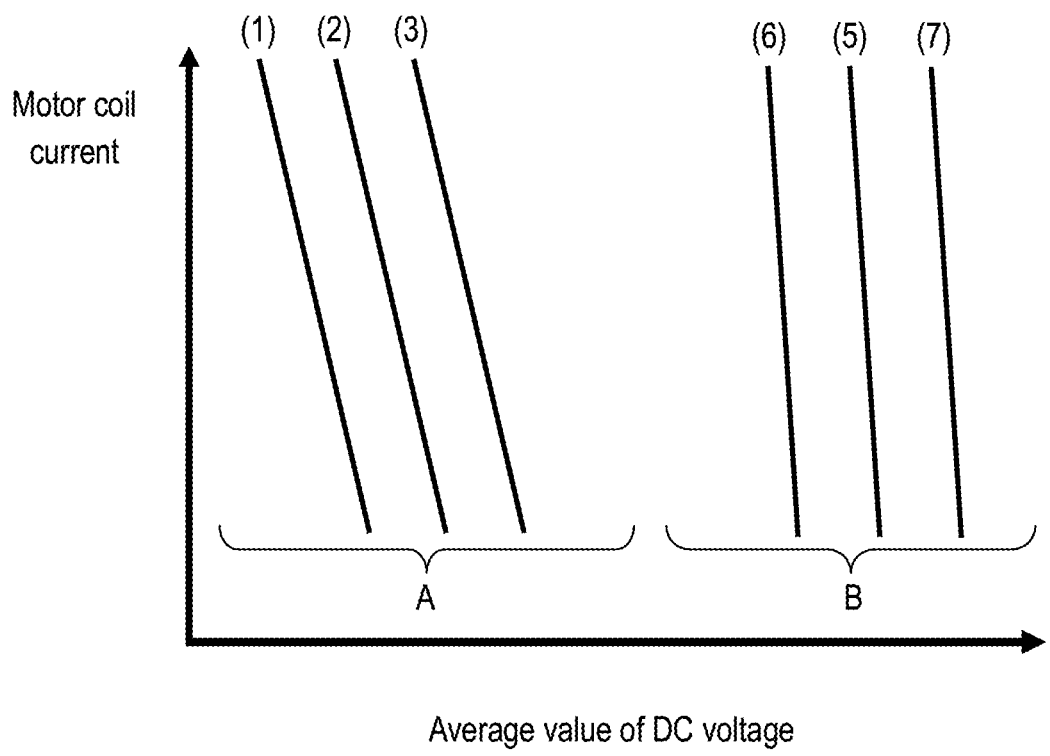
FIG. 6 is a graph illustrating a case when a plurality of estimated specification sets is included for an AC power supply for a ventilation device according to a second exemplary embodiment of the present invention.

Incidentally, due to a reason of a destination such as an export target, a specification of a commercial power supply could differ. In such a case, a relationship between a motor coil current and an average value of DC voltage could differ. FIG. 6 is a graph illustrating a case when a plurality of estimated specification sets is included for an AC power supply for ventilation device 6 according to a second exemplary embodiment of the present invention. In other words, the plurality of estimated specification sets includes, as shown in (1), (2), and (3) in FIG. 6, estimated specification set A where a reference voltage of commercial power supply 12 is 100 V, and, as shown in (5), (6), and (7) in FIG. 6, estimated specification set B where a reference voltage is 200 V.

If a reference voltage greatly changes, an inclination between, for example, a straight line around 100 V which approximates a relationship between a motor coil current and an average value of DC voltage, in other words, for example, straight line (2), and straight line (5) around 200 V could change.

Therefore, a relational expression for a motor coil current and an average value of DC voltage should properly be used per a specification of a commercial power supply.

To this end, by preparing a plurality of groups divided per a destination of a ventilation device, in other words, a specification of a commercial power supply, a plurality of relational expressions for motor coil currents and average values of DC voltages, as shown in FIG. 6, should be stored beforehand in target air volume computation unit 21. Here, three estimation tables configuring a group corresponding to estimated specification set A, and three estimation tables configuring a group corresponding to estimated specification set B are stored.

As shown in FIG. 2, control circuit 10 may be provided with specification setting switch 31 so that an estimated specification set can be switched using specification setting switch 31.

In other words, target air volume computation unit 21 is configured to read a setting of specification setting switch 31 to switch the above described specification set.

Specification setting switch 31 is provided inside control circuit 10. A service person operates to switch specification setting switch 31 when assembling or installing specification setting switch 31. In accordance with a switching state of specification setting switch 31, target air volume computation unit 21 switches a relational expression, or an estimated specification set, for a motor coil current and an average value of DC voltage, which is determined and stored beforehand per a destination of a ventilation device.

For example, when specification setting switch 31 is set to setting 1, specification set A for a 100 V specification is used, in other words, approximations of (1), (2), and (3) shown in FIG. 6 are used. When specification setting switch 31 is set to setting 2, estimated specification set B for a 200 V specification is used, in other words, approximations of (4), (5), and (6) shown in FIG. 6 are used. An estimated specification set is switched as described above.

Instead of the above described structure where target air volume computation unit 21 switches an estimated specification set, based on a setting of specification setting switch 31, target air volume computation unit 21 may perform a process described below.

That is, target air volume computation unit 21 determines a specification of a commercial power supply, based on a voltage detected by voltage detection unit 30 to set an estimated specification set defined per a specification of a commercial AC power supply.

Specifically, when a voltage detected by voltage detection unit 30 is a maximum of 150 V that is a predetermined voltage threshold value, estimated specification set A is used to estimate a power supply voltage. When a voltage detected by voltage detection unit 30 is a minimum of 150 V that is the predetermined voltage threshold value, estimated specification set B is used to estimate a power supply voltage.

The estimation method is as described in the first exemplary embodiment.

If a target air volume specification differs due to a reason of a destination, similar to a process for estimating a power supply voltage, values in the above described reference tables differ.

Figure 7:
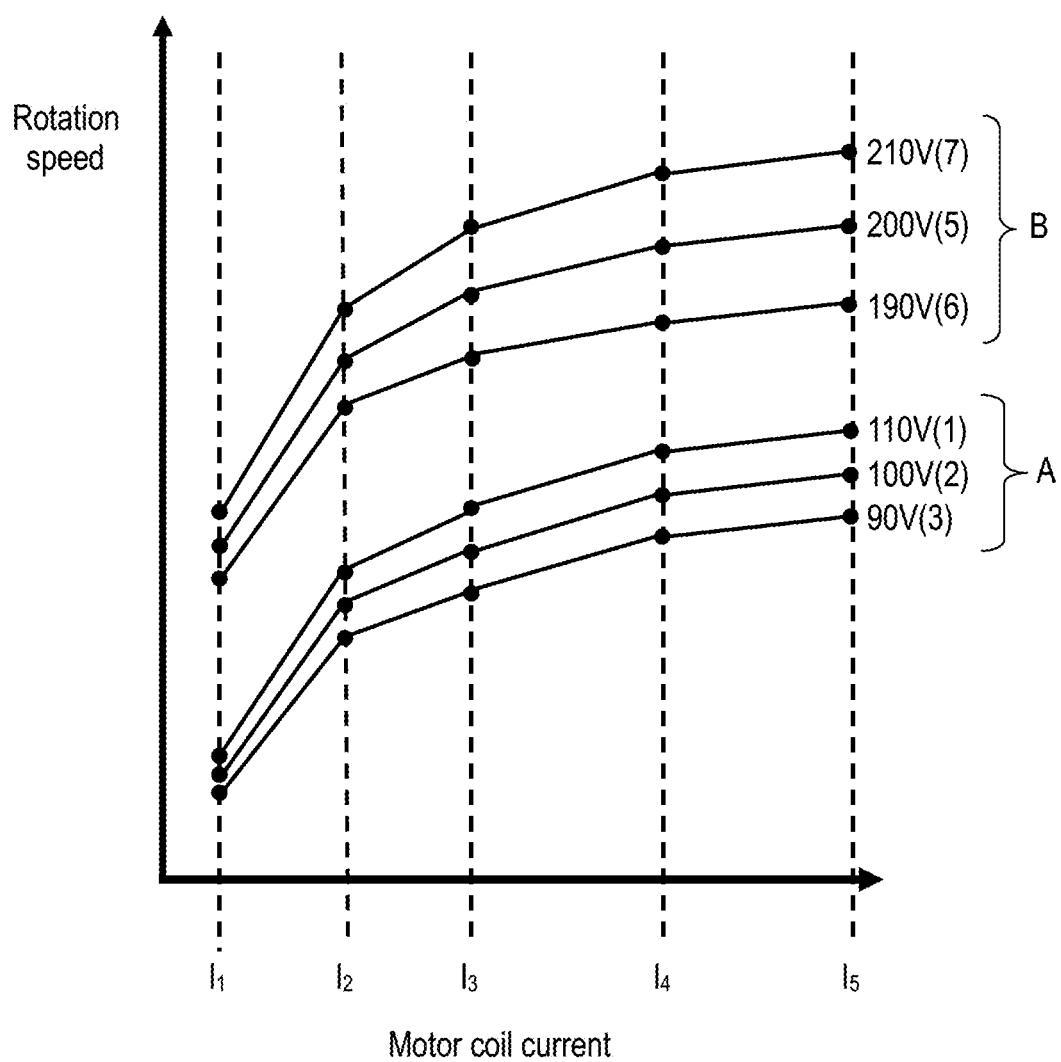
FIG. 7 is a graph illustrating a case when a plurality of target air volume specification sets is included for the ventilation device according to the second exemplary embodiment of the present invention.

To this end, by preparing a plurality of groups divided per a destination of a ventilation device, in other words, a specification of a commercial power supply a plurality of relational expressions for motor coil currents and rotation speeds, as shown in FIG. 7, should be stored beforehand in target air volume computation unit 21. Here, three reference tables A configuring a group corresponding to target air volume specification set A, and three reference tables configuring a group corresponding to target air volume specification set B are stored.

For example, when specification setting switch 31 is set to setting 1, target air volume specification set A for a destination with a 100 V specification is used, in other words, reference tables of (1), (2), and (3) shown in FIG. 7 are used. When specification setting switch 31 is set to setting 2, target air volume specification set B for a destination with a 200 V specification is used, in other words, reference tables of (5), (6), and (7) shown in FIG. 7 are used.

Instead of the above described structure where a reference table is switched based on a setting of specification setting switch 31, switching may be performed as described below, similar to the estimation tables.

Specifically, when a voltage detected by voltage detection unit 30 is a maximum of 150 V that is a predetermined voltage threshold value, target air volume specification set A is used. In other words, (1), (2), and (3) shown in FIG. 7 are used as reference tables. When a voltage detected by voltage detection unit 30 is a minimum of 150 V that is the predetermined voltage threshold value, target air volume specification set B is used. In other words, (5), (6), and (7) shown in FIG. 7 are used as reference tables.

When generating a new reference table, the switched reference tables are used. The procedure is as described in the first exemplary embodiment.

Depending on a specification of a motor, a reference table with respect to a target air volume might change in proportion to a power supply voltage. Or, depending on a current range or rotation speed range to be used, it may be regarded that a reference table is proportional to a power supply voltage. In this case, a computation is possible by storing at least two reference tables, without properly using a plurality of reference tables.

As described above, ventilation device 6 according to this exemplary embodiment may include specification setting switch 31 for switching a setting of a power supply specification of a supplied AC voltage, and a plurality of estimated specification sets in which the power supply specification and at least two estimation tables corresponding to the power supply specification are associated with each other. Target air volume computation unit 21 may select an estimated specification set to be used from the plurality of estimated specification sets, based on specification setting switch 31. Therefore, a memory resource can be prevented from being wasted.

Ventilation device 6 may include a plurality of estimated specification sets in which a power supply specification of a supplied AC voltage and at least two estimation tables corresponding to the power supply specification are associated with each other. Target air volume computation unit 21 may select an estimated specification set to be used from the plurality of estimated specification sets, based on a DC voltage detected by voltage detection unit 30. Therefore, a memory resource can be prevented from being wasted.

Ventilation device 6 may include, specification setting switch 31 for switching a setting of a power supply specification of a supplied AC voltage, and a plurality of target air volume specification sets in which the power supply specification and at least two reference tables corresponding to the power supply specification are associated with each other. Target air volume computation unit 21 may select a target air volume specification set to be used from the plurality of target air volume specification sets, based on specification setting switch 31. Therefore, a memory resource can be prevented from being wasted.

Ventilation device 6 may include a plurality of target air volume specification sets in which a power supply specification of a supplied AC voltage and at least two reference tables corresponding to the power supply specification are associated with each other. Target air volume computation unit 21 may select a target air volume specification set to be used from the plurality of target air volume specification sets, based on a DC voltage detected by voltage detection unit 30. Therefore, a memory resource can be prevented from being wasted.

INDUSTRIAL APPLICABILITY

A ventilation device according to the present invention, which is to be attached in a building, is widely applicable to products to be operated at a constant air volume, regardless of a duct resistance and an external wind pressure.

REFERENCE MARKS IN THE DRAWINGS

1 interior
2 attic
3 body
4 adaptor
5 exhaust duct
6 ventilation device
7 blades
8 motor
9 louver
10 control circuit
10a signal line
11 remote controller
11a power supply ON-OFF switch
11b fan notch setting switch
12 commercial power supply
13 AC-DC conversion circuit
14 smoothing capacitor
15 inverter circuit
16 stator
17 rotor
18 shunt resistors
19 amplifier
20 current detection unit
21 target air volume computation unit
22 amplification factor changing unit
23 speed controller
24 air volume computation unit
25 rotation detection unit
30 voltage detection unit
31 specification setting switch
32 AC voltage estimation unit

The invention claimed is:

1. A ventilation device comprising:
   a blade
   a motor that drives the blade;
   an alternating current-direct current conversion circuit that converts an AC voltage supplied externally into a DC voltage to output the DC voltage;
   an inverter circuit that converts the DC voltage output from the AC-DC conversion circuit into an AC voltage through a three-phase pulse width modulation method to apply the AC voltage to the motor;
   a voltage detection unit that detects the DC voltage applied to the inverter circuit;
   a current detection unit that detects a current flowing into the motor;
   a rotation detection unit that computes a rotation speed and a position of the motor, based on the current detected by the current detection unit;
   a target air volume computation unit that outputs a target air volume toward which the motor provides an air volume;
   an air volume computation unit that compares a present output air volume with the target air volume output from the target air volume computation unit to instruct the rotation speed;
   a speed controller that changes a duty for the inverter circuit, based on a result of comparison performed by the air volume computation unit, to control the rotation speed of the motor; and
   an AC voltage estimation unit that estimates the AC voltage, based on the DC voltage detected by the voltage detection unit and the current detected by the current detection unit,
   wherein
   the air volume computation unit determines the rotation speed of the motor, based on the AC voltage estimated by the AC voltage estimation unit and the target air volume output from the target air volume computation unit.

2. The ventilation device according to claim 1, wherein the AC voltage estimation unit estimates the AC voltage, based on a first estimation table storing a digitized relationship between a first DC voltage and a current flowing into a coil of the motor when the first DC voltage is applied, a second estimation table storing a digitized relationship between a second DC voltage and a current flowing into the coil of the motor when the second DC voltage is applied, the DC voltage detected by the voltage detection unit, and the current detected by the current detection unit.

3. The ventilation device according to claim 1, further comprising
   two reference tables corresponding to two different AC voltages,
   the reference tables each storing
      a target air volume A,
      an AC voltage B,
      a current value C for achieving the target air volume A when the AC voltage B is applied, and
      a rotation speed D for achieving the target air volume A when the AC voltage B is applied, all of which are associated with each other,
   wherein
   when the supplied AC voltage differs from the AC voltage B, the air volume computation unit generates, based on the two reference tables and an AC voltage estimated by the AC voltage estimation unit, a new reference table corresponding to the estimated AC voltage to determine a rotation speed of the motor, based on the new reference table and the estimated AC voltage.

4. The ventilation device according to claim 2, further comprising:
   a specification setting switch that switches a setting of a power supply specification of the supplied AC voltage, and
   a plurality of estimated specification sets in which the power supply specification and at least two estimation tables corresponding to the power supply specification are associated,
   wherein
   the target air volume computation unit selects an estimated specification set to be used from the plurality of estimated specification sets, based on the specification setting switch.

5. The ventilation device according to claim 2, further comprising
   a plurality of estimated specification sets in which a power supply specification of the supplied AC voltage and at least two estimation tables corresponding to the power supply specification are associated,
   wherein
   the target air volume computation unit selects an estimated specification set to be used from the plurality of estimated specification sets, based on a DC voltage detected by the voltage detection unit.

6. The ventilation device according to claim 3, further comprising:
   a specification setting switch that switches a setting of a power supply specification of the supplied AC voltage; and
   a plurality of target air volume specification sets in which the power supply specification and the at least two reference tables corresponding to the power supply specification are associated,
   wherein
   the target air volume computation unit selects a target air volume specification set to be used from the plurality of target air volume specification sets, based on the specification setting switch.

7. The ventilation device according to claim 3, further comprising
   a plurality of target air volume specification sets in which a power supply specification of the supplied AC voltage and the at least two reference tables corresponding to the power supply specification are associated,
   wherein
   the target air volume computation unit selects a target air volume specification set to be used from the plurality of target air volume specification sets, based on a DC voltage detected by the voltage detection unit.

* * * * *